United States Patent
Shuntich

(10) Patent No.: US 10,149,487 B2
(45) Date of Patent: Dec. 11, 2018

(54) SUPERCOOLED BEVERAGE CRYSTALLIZATION SLUSH DEVICE WITH ILLUMINATION

(71) Applicant: Supercooler Technologies, Inc., Maitland, FL (US)

(72) Inventor: Douglas Shuntich, Maitland, FL (US)

(73) Assignee: Supercooler Technologies, Inc., Maitland, FL (US)

( * ) Notice: Subject to any disclaimer, the term of this patent is extended or adjusted under 35 U.S.C. 154(b) by 487 days.

(21) Appl. No.: 14/731,850

(22) Filed: Jun. 5, 2015

(65) Prior Publication Data

US 2015/0264968 A1 Sep. 24, 2015

Related U.S. Application Data

(63) Continuation-in-part of application No. 14/298,117, filed on Jun. 6, 2014, now Pat. No. 9,845,988.

(60) Provisional application No. 61/966,106, filed on Feb. 18, 2014, provisional application No. 61/999,812, filed on Aug. 7, 2014, provisional application No. 62/176,031, filed on Feb. 9, 2015.

(51) Int. Cl.
```
A23G 9/04      (2006.01)
A23G 9/08      (2006.01)
A23L 5/30      (2016.01)
```
(52) U.S. Cl.
CPC ............... *A23G 9/045* (2013.01); *A23G 9/08* (2013.01); *A23L 5/32* (2016.08)

(58) Field of Classification Search
CPC ... A23G 9/045; A23L 3/30; A23L 3/36; A23L 3/364; A23L 5/32; F25D 31/007
See application file for complete search history.

(56) References Cited

U.S. PATENT DOCUMENTS

| 136,632 A | 3/1873 | Whipple |
|---|---|---|
| 714,415 A | 11/1902 | Trafford |
| 1,827,856 A | 10/1931 | Pope |
| 1,854,731 A | 4/1932 | Beran |

(Continued)

FOREIGN PATENT DOCUMENTS

| GB | 2391219 | 2/2004 |
|---|---|---|
| JP | 898675 | 4/1996 |

(Continued)

OTHER PUBLICATIONS

Shuntich, Supercooler Technologies, Inc., PCT Application No. PCT/US2015/034418 filed Jun. 5, 2015, Notification of Transmittal of the International Search Report and the Written Opinion of the International Searching Authority, or the Declaration dated Sep. 14, 2015, 15 pages.

(Continued)

*Primary Examiner* — Jianying Atkisson
*Assistant Examiner* — Antonio R Febles
(74) *Attorney, Agent, or Firm* — Brian S. Steinberger; Law Offices of Brian S. Steinberger, P.A.

(57) ABSTRACT

Methods, processes, apparatus, devices, kits and systems for crystallizing liquid to form slush inside of supercooled to below 32 F closed beverage bottles or cans, beverages in fountain dispensers, desserts, and food items by transmitting ultrasonic signals in short time spans, while allowing for optional illuminating the effects when the supercooled liquid is crystallized into slush.

19 Claims, 13 Drawing Sheets

(56) References Cited

U.S. PATENT DOCUMENTS

| | | |
|---|---|---|
| 1,984,047 A | 12/1934 | Thieme |
| 2,061,427 A | 11/1936 | King |
| 2,073,176 A | 3/1937 | Quinn |
| 2,094,774 A | 10/1937 | Dawson |
| 2,289,645 A | 7/1942 | Geistert |
| 2,314,586 A | 3/1943 | Levison |
| 2,405,091 A | 7/1946 | Culbreth |
| 2,446,614 A | 8/1948 | Sherick |
| 2,629,229 A | 2/1953 | Hull |
| 2,736,174 A | 2/1956 | Tice |
| 2,764,489 A | 9/1956 | Veazey |
| 2,923,786 A | 2/1960 | Jones |
| 2,990,624 A | 7/1961 | Granath |
| 3,065,553 A | 11/1962 | Olin |
| D198,488 S | 6/1964 | Reis |
| 3,284,991 A | 11/1966 | Ploeger |
| 3,401,858 A | 9/1968 | White |
| 3,434,410 A | 3/1969 | Galle |
| 3,453,083 A | 7/1969 | Beerli |
| 3,718,485 A | 2/1973 | Lankford |
| 3,813,928 A | 6/1974 | Anderson |
| 3,860,166 A | 1/1975 | Anderson |
| 3,915,285 A | 10/1975 | Lindquist |
| 3,987,211 A | 10/1976 | Dunn |
| 4,164,851 A | 8/1979 | Bryant |
| 4,172,365 A | 10/1979 | McClintock |
| 4,358,932 A | 11/1982 | Helfrich, Jr. |
| 4,493,156 A | 1/1985 | Siegmann |
| 4,549,409 A | 10/1985 | Smith |
| 4,580,405 A | 4/1986 | Cretzmeyer |
| D293,758 S | 1/1988 | Balisteri |
| 4,736,600 A | 4/1988 | Brown |
| 4,785,959 A | 11/1988 | Kleiner |
| 4,825,665 A | 5/1989 | Micallef |
| 4,979,994 A | 12/1990 | Dussault |
| 5,269,156 A | 12/1993 | Van De Velde |
| 5,282,368 A | 2/1994 | Ordoukhanian |
| 5,477,623 A | 12/1995 | Tomizawa |
| 5,505,054 A | 4/1996 | Loibl |
| 5,653,123 A | 8/1997 | Handlin |
| 5,695,795 A | 12/1997 | Murray |
| D392,514 S | 3/1998 | Steinfels |
| 5,880,359 A | 3/1999 | Kono et al. |
| 5,939,120 A | 8/1999 | Bogue |
| 5,966,964 A | 10/1999 | Patee |
| 6,116,042 A | 9/2000 | Purdum |
| D449,763 S | 10/2001 | Harris, Jr. |
| 6,314,751 B1 | 11/2001 | Gjersvik |
| D455,607 S | 4/2002 | Johnson |
| 6,413,444 B1 | 7/2002 | Kasza |
| 6,543,154 B2 | 4/2003 | Horigane |
| 6,662,574 B2 | 12/2003 | Loibl |
| 6,691,530 B2 | 2/2004 | Lee |
| 6,730,341 B2 | 5/2004 | Ludwig |
| D508,719 S | 8/2005 | De Haas |
| 6,945,069 B2 | 9/2005 | Lee |
| D540,126 S | 4/2007 | Leahy |
| D552,417 S | 10/2007 | Ben-Shlomo et al. |
| D569,692 S | 5/2008 | Zell |
| D574,128 S | 8/2008 | Meiry |
| 7,520,212 B2 * | 4/2009 | Smith ............... B67D 1/06 366/110 |
| D614,442 S | 4/2010 | Smith |
| 7,707,848 B2 | 5/2010 | Loibl |
| 7,712,321 B2 | 5/2010 | Kadyk |
| 7,874,167 B2 | 1/2011 | Kammer |
| D655,122 S | 3/2012 | Bingul et al. |
| 8,132,960 B2 | 3/2012 | Zhuang |
| 8,464,544 B2 | 6/2013 | Shin et al. |
| 8,549,993 B2 | 10/2013 | Foster |
| 8,572,990 B2 | 11/2013 | Chung et al. |
| D705,607 S | 5/2014 | Zorovich et al. |
| D707,497 S | 6/2014 | Tello |
| 9,024,168 B2 | 5/2015 | Peterson |
| 9,134,059 B2 | 9/2015 | Chung et al. |
| 9,234,697 B2 | 1/2016 | Youn et al. |
| D749,913 S | 2/2016 | Feng |
| D778,687 S | 2/2017 | Shuntich |
| 9,631,856 B2 | 4/2017 | Shuntich |
| 9,845,988 B2 | 12/2017 | Shuntich |
| 9,989,300 B1 | 6/2018 | Shuntich |
| 2002/0124576 A1 | 9/2002 | Loibl |
| 2003/0192435 A1 | 10/2003 | McNair |
| 2004/0103552 A1 | 6/2004 | Rhon |
| 2004/0112413 A1 | 6/2004 | Brunner |
| 2004/0144103 A1 | 7/2004 | Lee |
| 2005/0142268 A1 | 6/2005 | Scullion |
| 2005/0166768 A1 | 8/2005 | Porat |
| 2006/0185372 A1 | 8/2006 | Conde-Hinojosa |
| 2006/0191086 A1 | 8/2006 | Mourad |
| 2006/0225439 A1 | 10/2006 | Morris, III |
| 2007/0057388 A1 | 3/2007 | McCabe |
| 2007/0137223 A1 | 6/2007 | Brekke |
| 2007/0163289 A1 | 7/2007 | Hahm et al. |
| 2007/0204629 A1 * | 9/2007 | Lofy ............... B60N 3/104 62/3.61 |
| 2008/0134695 A1 | 6/2008 | Loibl |
| 2008/0141701 A1 | 6/2008 | Lewis |
| 2008/0196443 A1 | 8/2008 | Footer |
| 2009/0314012 A1 | 12/2009 | Lim et al. |
| 2010/0008178 A1 | 1/2010 | Fahrion |
| 2010/0058776 A1 | 3/2010 | Loibl et al. |
| 2010/0062120 A1 | 3/2010 | Jang et al. |
| 2010/0205986 A1 | 8/2010 | Chung et al. |
| 2010/0218510 A1 | 9/2010 | Kim et al. |
| 2010/0029370 A1 | 11/2010 | Mooijer |
| 2010/0293970 A1 | 11/2010 | Mooijer |
| 2011/0219805 A1 | 9/2011 | Youn et al. |
| 2011/0302940 A1 | 12/2011 | Youn |
| 2011/0308264 A1 | 12/2011 | Youn |
| 2012/0106130 A1 | 5/2012 | Beaudette |
| 2013/0160987 A1 | 6/2013 | Grigorian |
| 2013/0180280 A1 | 7/2013 | Grigorian |
| 2013/0196044 A1 | 8/2013 | Winston et al. |
| 2014/0125577 A1 | 5/2014 | Hoang |
| 2015/0112451 A1 | 4/2015 | Dechev |
| 2016/0131421 A1 | 5/2016 | Bogaard |
| 2016/0209098 A1 | 7/2016 | Kim |

FOREIGN PATENT DOCUMENTS

| | | |
|---|---|---|
| KR | 1020080088944 | 10/2008 |
| KR | 1020100018887 | 2/2010 |
| WO | 0049347 | 8/2000 |

OTHER PUBLICATIONS

Shuntich, D.J., PCT Serial No. PCT/US2014/047214 filed Jul. 18, 2014, Notification Concerning Transmittal of International Preliminary Report on Patentability dated Aug. 4, 2016, 13 pages.

Shuntich, D.J., PCT Serial No. PCT/2015/034418, filed Jun. 5, 2015, Notification Concerning Transmittal of International Preliminary Report on Patentability dated Dec. 15, 2016, 11 pages.

Shields, New Refrigeration Tech Cools Drink in 45 Seconds, Food & Drink International, 2014, www.fdiforum.net, 3 pages.

Shuntich, D.J., PCT Serial No. PCT/US14/47214, International Search Report and Written Opinion, dated Nov. 20, 2014, 18 pages.

Ultrasonic Degassing and Defoaming of Liquids, Hielscher—Ultrasound Technology, 2015, 5 pages.

Supercooler Technologies, Inc., Eurpean Serial No. 15803479.3, filed Mar. 17, 2017, European Supplementary Search Report, dated Apr. 4, 2017, 7 pages.

Shuntich, D., Utility U.S. Appl. No. 14/552,448, filed Nov. 24, 2014, Office Action Summary dated Aug. 24, 2018, 32 pages.

* cited by examiner

SUPERCOOLED BEVERAGE CRYSTALLIZATION SLUSH DEVICE WITH ILLUMINATION

CROSS REFERENCE TO RELATED APPLICATIONS

This application is a Continuation-In-Part of U.S. patent application Ser. No. 14/298,117 filed Jun. 6, 2014, which claims the benefit of priority to U.S. Provisional Application Ser. No. 61/966,106 filed Feb. 18, 2014, and this application claims the benefit of priority to U.S. Provisional Patent Application Ser. No. 61/999,812 filed Aug. 7, 2014 and U.S. Provisional Patent Application Ser. No. 62/176,031 filed Feb. 9, 2015. The entire disclosure of each of the applications listed in this paragraph are incorporated herein by specific reference thereto.

FIELD OF INVENTION

This invention relates to supercooled beverages being instantly transformed into from a liquid state to ice-crystal 'slush' beverages inside sealed containers, beverages in fountain dispensers, beverage merchandisers and vending machines, desserts, and food items, and in particular to methods, processes, apparatus, devices, kits and systems for crystallizing supercooled liquid to form slush inside of supercooled to below 32 F, such as between approximately 15 F to approximately 26 F, in beverage bottles or cans, beverages in fountain dispensers, desserts, and foods by transmitting ultrasonic signals in short time spans, with or without illuminating the crystallization effects.

BACKGROUND AND PRIOR ART

Bagged ice has been popular to be used in portable coolers to chill canned and bottled beverages, where the bags generally comprise loose ice cubes, chips, that are frozen fresh water. The user places the bag(s) in coolers and adds canned and/or bottled beverages, to the coolers of packaged-ice.

Due to the melting properties of fresh-water ice, canned and bottled beverages placed in ice cannot be chilled below 32 degrees Fahrenheit for any significant length of time, which is the known general freezing point.

Ice-melters such as salt have been known to be used to lower the melting point of fresh-water ice. Sprinkling loose salt on packed-ice in a cooler to produce lower temperatures for canned and bottled beverages placed inside. Sprinkling salt has been tried with beer, since beer will not freeze at 32 degrees due to its alcohol content. However, sprinkling loose salt has problems.

Due to the uneven spread of salt on ice, it is impossible to know or control the precise resulting temperate below 32 degrees on various ice-cubes in the cooler obtained by sprinkling of salt. Salt sprinkling has resulted in some beverages "freezing hard" while others remain liquid and sometimes at above 32 degrees. The spreading of salt or other ice-melters on packaged-ice in a cooler to obtain temperatures less than 32 degrees is impractical to know and control precisely the resulting temperature of ice-cubes in a cooler environment Some devices rely on traditional refrigeration and/or placing ice inside the beverage to obtain cold temperatures. At home devices such as SODASTREAM® by Soda-Club ($CO_2$) Atlantic GmbH, and KEURIG COLD™ by Keurig Green Mountain Inc. rely on basic methods for cooling, and each has drawbacks.

Traditional refrigeration offers a relatively slow and inefficient method of cooling, requiring hours to obtain approximately 40 F drinking temperatures.

Ice inside of liquid is also popular to cool beverages. However, placing ice inside a liquid has the drawbacks of: 1) watered-down flavoring, 2) introducing impurities, 3) causing premature de-carbonation of carbonated beverages.

Non-traditional method of cooling cans/bottles rapidly by spinning on their axis while the can/bottle is in contact with ice or 'ice-cold' liquid (usually fresh water at or near approximately 32 deg-F) was also attempted. U.S. Pat. No. 5,505,054 to Loibl et al. describes beverage cooling that attempts to reduce beverage cooling times from hours to close to a minute without putting ice inside.

SPINCHILL™, www.spinchill.com use portable type drills with a suction cup to attach to a canned beverage with 'cooling times' of 60 seconds or less for canned beverages spun at roughly 450 rpm in a standard ice-cooler containing ice and/or iced-water, though the term 'cooling' is used loosely and generally describes a beverage temperature between 40-50 F or so.

Some non-traditional beverage cooling devices generally spin cans/bottles at a constant rpm (revolutions per minute) rate in one-direction only, and expose the can/bottle again and again to ice or cold liquid to rapidly cool the beverage.

These devices seek to minimize agitation inside the canned or bottled beverage by spinning them at relatively mild rates of 350-500 rpm which, they believe, is optimal for rapid cooling and prevents undesirable foaming of carbonated beverages and beer.

These devices require up to several minutes of spinning in a cooling medium to obtain 'ice-cold' drinking temperatures, and do not automatically indicate when a beverage has reached optimal or lowest drinking temperature.

Alcoholic and non-alcoholic bottled and canned beverages of all varieties, including bottled water, has been known to be super cooled below 32 deg-F while remaining liquid for short periods of time. What is not generally known is how to cool these beverages rapidly to precise super cooled temperatures which allow for enjoyable 'slush-on-demand' drinking experiences while preventing unwanted or premature freezing which results in undesirable effects such as 1) premature foaming or release of carbonation in an undesirable way, and 2) hard frozen or 'chunky' frozen beverages which are difficult to consume.

Prior art does not describe supercooling beverages below 32-degrees and/or below their freezing point while keeping a liquid state allowing previously impossible beverage options, such as creating instant milkshakes from super cooled milk beverages and creating instant smoothies from super cooled fruit and vegetable juices without the need to blend-in chopped-ice into the smoothie.

Supercooled beverages are increasingly popular due to the ability to create instant "slushy drinks" by nucleating the supercooled beverage and causing instant soft ice-crystal formation throughout the beverage. Traditional methods for nucleating supercooled liquid beverages involve 1) disturbing the beverage container via shaking, slamming, or hitting the beverage container with enough force to cause ice-crystals to begin forming, or 2) opening the beverage container and exposing the liquid to air and then disturbing the liquid in hopes of creating a nucleation site for ice crystals to being forming. Another method for nucleating supercooled beverages involves opening the beverage and pouring the supercooled liquid into a cup or glass containing seed crystals of ice, which starts the nucleation process and creates an instant slushy drink in a glass. Of all of these methods, none of them can reliably and consistently cause nucleation-on-demand for all varieties of supercooled beverages in sealed containers without the containers being opened.

For example, if a supercooled carbonated beverage is purchased from a vending machine or merchandiser, there are limited options to start the nucleation process. Shaking or slamming may cause the desired ice-crystal nucleation of the beverage, but can also cause unwanted foaming due to the carbonation within the beverage. So choices are limited to exposing it to air (opening the beverage) which has a high probability of failure in inducing ice-crystal nucleation or pouring the liquid into a glass containing ice crystals which may be undesirable or impractical in many point of purchase situations.

Furthermore, due to the temperatures required for nucleation to occur, users have roughly 90-120 seconds to begin the ice-crystal nucleation process once the beverage is removed from the supercooled refrigerated environment of a typical home freezer or that of a specialized merchandiser or vending machine, or the supercooled beverage may become too warm for ice-crystal nucleation to occur. Ideally, the supercooled beverage should either be nucleated before being dispensed by the vending machine, or by the consumer immediately upon removing the beverage from the specialized supercooling merchandiser or vending machine without having to open the bottle/can and with no unwanted foaming occurring when opening the container.

In addition, the ice-crystal nucleation process can be spectacular and exciting to watch inside of a see-through bottle, and the ability to illuminate or back-light the liquid during ice-crystal nucleation can add significant visual excitement for the consumer at the point of purchase as well as a convenient way to verify that the ice-crystal nucleation or 'slushing' process was successful.

Thus, the need exists for solutions to the above problems with the prior art.

SUMMARY OF THE INVENTION

A primary objective of the present invention is to provide methods, processes, apparatus, devices, kits and systems for crystallizing liquid to form slush inside of supercooled to below 32 F beverage bottles and cans, beverages in fountain dispensers, desserts, and food items by transmitting ultrasonic frequencies with or without illuminating the rapid crystallization effects.

A secondary objective of the present invention is to provide methods, processes, apparatus, devices, kits and systems for crystallizing liquid to form slush inside of supercooled to below 32 F closed beverage bottles or cans with nucleation-on-demand in without the need to open the beverage bottles or cans.

A third objective of the present invention is to provide methods, processes, apparatus, devices, kits and systems for crystallizing liquid to form slush inside of supercooled to below 32 F in the closed beverage bottles or cans without causing unwanted foaming of carbonated beverages upon opening the bottles of cans.

A fourth objective of the present invention is to provide methods, processes, apparatus, devices, kits and systems for crystallizing liquid to form slush inside of supercooled to below 32 F closed beverage bottles or cans, as an integral part of a vending machine or as a stand-alone electric or battery operated nucleation device to allow store clerks, restaurant servers, or consumers to nucleate sealed beverage bottles or cans without opening the bottles or cans.

A fifth objective of the present invention is to provide methods, processes, apparatus, devices, kits and systems for crystallizing liquid to form slush inside of supercooled to below 32 F sealed or closed beverage bottles, by illuminating the ice-crystal nucleation on-demand in a closed bottle by providing backlighting and/or side-lighting and/or front-lighting and/or top-lighting and/or bottom lighting via LED's, florescent, neon, or other light sources and types while the beverage is in the bottle.

The invention can be used with closed beverage bottles, that include glass bottles and plastic bottles, as well as canned beverages, such as those in aluminum cans, and the like. It can also be used with beverages or cold liquids stored in sealed packages of cardboard, waxed paper, or of other construction of sealed and unsealed beverage containers.

A preferred embodiment uses an ultrasonic transducer (28 khz, 40 khz, 60 khz, or higher or lower khz value) to produce ultrasonic waves though a liquid medium which may be in direct contact with the beverage container or in direct contact with a thin membrane which is subsequently in direct contact with the beverage container.

An electronic timer allows for short-duration burst(s) of ultrasonic waves produced by the ultrasonic transducer (between approximately one-tenth of a second and approximately two seconds or more or less) when a firing switch is activated. The firing switch can either an automatic detector that senses the presence of a beverage container (and possibly the size and type of beverage) or a manually operated push-button switch to fire the ultrasonic transducer.

An ultrasonic pulse within the liquid medium that is in direct or indirect contact with the beverage container will cause cavitations within the molecules of the supercooled beverage which result in small areas of ice-crystal nucleation within the beverage which will spread throughout the supercooled beverage due to the properties of molecular structure of supercooled liquids, resulting in the subsequent "slushing" of the entire supercooled beverage within a relatively short period of time of between 2 and 60 seconds depending on the type of beverage and it's ingredients (non-sugared beverages generally have quicker 'slushing times' than heavily sugared beverages). By carefully controlling the timing (and number) of the ultrasonic pulse or pulses, a carbonated beverage can be nucleated for ice-crystal formation without causing unwanted foaming (carbonation nucleation) of the beverage upon opening.

The invention can also be designed to cause ice-crystal nucleation of supercooled beverages from fountain drink or other free-flowing beverage dispensing mechanisms (not shown) via direct or indirect contact between the ultrasonic transducer and the free-flowing supercooled liquid beverage.

Additional embodiments allow for enhancing the visible beauty of ice-crystal nucleation-on-demand in a sealed container beverage by providing a backlighting and/or side-lighting and/or front-lighting and/or top-lighting and/or bottom lighting via LEDs (light emitting diodes), florescent, neon, or other light sources and types while the beverage is undergoing 'slushing'.

Lights can be switched on manually or automatically with a pressure switch or other switch mounted such to detect the presence of a bottled beverage when placed in contact with the ultrasonic nucleator device.

An optional rotation device, can rotate the beverage container for a short period of time (from approximately 0.2 sec to approximately 20 seconds, or more or less) prior to the ultrasonic nucleation pulse, which will provide rotational motion of the ice-crystal formation during nucleation. The device can be equipped with multi-color lights, LED's, or flashing or 'moving' LED's or other light sources.

Backlighting and/or other lighting can enhance the visibility of ice-crystal formation and subsequent 'slushing' of the entire bottled beverage and the reflection and diffraction of light amongst the crystals as they form in the beverage container. Once the beverage container is removed from the nucleation device, the lighting can be switched-off manually or automatically via detection switch(s) or a pressure switch.

Additionally, a large arcade style button can be optionally incorporated to allow the user to press and begin the rotation process and the ultrasonic pulse for ice-crystal nucleation to occur.

In another embodiment, Backlighting, side-lighting or other lighting can be part of the nucleation device or separate from the device. Additionally, the optional rotation mechanism can be a part of the nucleation device or separate from it. Additionally, an arcade style activation button can be part of the nucleation device or separate.

All components of the invention can be constructed as part of the larger assembly of a supercooling beverage merchandiser, supercooling vending machine, or other supercooling capable refrigerated device, or can be made separate and free-standing either individually or collectively.

Further objects and advantages of this invention will be apparent from the following detailed description of the presently preferred embodiments which are illustrated schematically in the accompanying drawings.

BRIEF DESCRIPTION OF THE FIGURES

FIG. 12 is another perspective view of another embodiment of a device for crystallizing liquid to form slush inside chilled bottles using a side touch 'wand' device attached to an ultrasonic transducer without the need for a bowl or base to set the bottle on.

DESCRIPTION OF THE PREFERRED EMBODIMENTS

Figure 1:
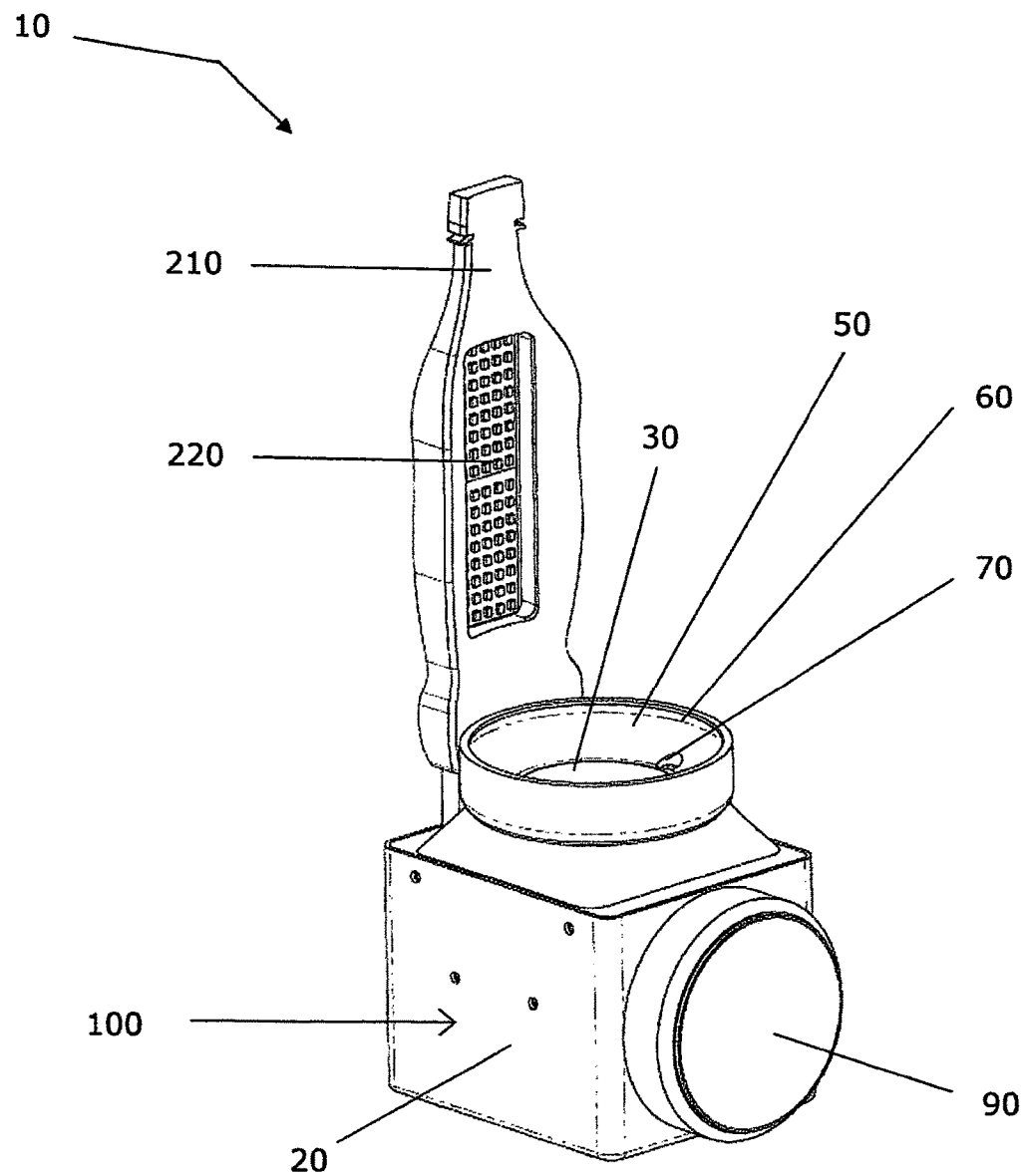
FIG. 1 is an upper front left perspective view of a first embodiment of a device for crystallizing liquid to form slush inside chilled bottles with an illumination source.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 device for crystallizing liquid to form slush inside of supercooled to below 32 F closed beverage bottles or cans with illumination source 20 stand (base)

30 ultrasonic transducer

35 Top cover for base 45 neck cover for ultrasonic transducer 50 bowl for bottle 60 thin membrane transmission membrane over transmission medium (liquid, water, gel)

70 fill nozzle 80 power source such as power cord with plug to 120 volt power supply or internal batteries 85 mounting bridge and force sensitive resistor (pressure switch)

90 push button switch 100 schematic of electronic components 101 pressure switch (85)

102 Arduino or IC (integrated circuit) smart board electronics

103 Ready LED to indicate button may be pushed

104 D/C (direct current) relay 105 beverage bottle illumination source (220)

106 push button switch(s) (90)

107 solid state relay 108 40 khz ultrasonic transducer power electronics board (40)

109 ultrasonic transducer (30)

110 sound output electronics and speaker 111 power source 205 closed or sealed beverage bottle or container 210 back wall for illumination source 215 start of nucleation (crystallization) in liquid inside 220 illumination source (LEDs)

240 side mount for refrigerated beverage merchandiser or cooler 250 flanges for attaching device base to side mount 260 refrigerated beverage merchandiser or other cooling device 310 second embodiment device with illuminator source
315 bottled container
320 stand
330 illumination source
340 removable bowl/bowl assembly
345 sealed transmission medium
347 wafer style ultrasonic transducer
348 bowl base
349 contacts for transducer
350 touch sensitive push button to fire ultrasonic transducer
360 ready indicator LED
370 touch sensitive push button to power-on the system
380 power-on indicator LED
400 Wand embodiment
410 ultrasonic transducer
420 ultrasonic power and control electronics board
425 ultrasonic transducer holder and force sensitive resistor (pressure switch)
430 bottle design plate with back lighting LED's
440 wand attachment
450 watertight transmission medium (water or gel)
460 mounting box The invention is to be used with beverage containers, such as bottles or cans whose contents have be supercooled to below at least approximately 32 F, such as to between approximately 15 F to approximately 26 F. Such techniques for reaching these temperatures has been described, and shown in parent patent applications to the same inventor in U.S. patent application Ser. No. 14/298,117 filed Jun. 6, 2014, which claims the benefit of priority to U.S. Provisional Application Ser. No. 61/966,106 filed Feb. 18, 2014, which are incorporated by reference in its' entirety.

Other techniques for supercooling the beverage containers to these temperatures are also shown and described in additional parent patent applications to the same inventor, which include U.S. patent application Ser. No. 14/163,063 filed Jan. 24, 2014, which claims the benefit of U.S. Provisional Patent Application Ser. No. 61/849,412 filed Jan. 28, 2013, which are also incorporated by reference in their entirety.

The invention takes these supercooled beverage containers and activates an ice-crystallization of the liquid inside to turn the liquid into a slush with the container remaining sealed if desired.

Figure 2:
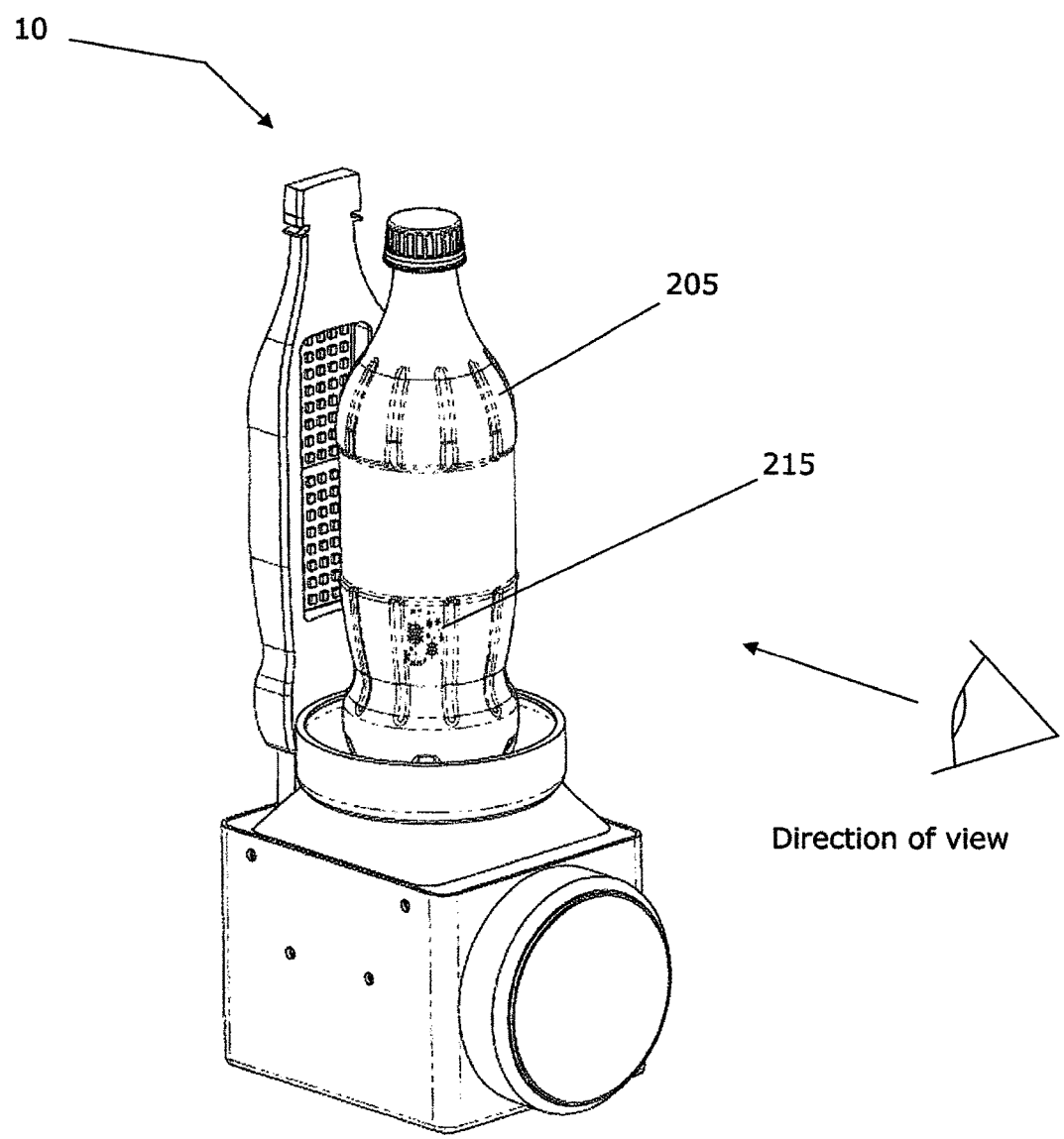
FIG. 2 is another perspective view of the device of FIG. 1 with a bottle mounted on the device.

FIG. 1 is an upper front left perspective view of a first embodiment of a device 10 for crystallizing liquid to form slush inside chilled bottles with an illumination source 220. FIG. 2 is another perspective view of the device 10 of FIG. 1 with a bottle mounted 205 on the device 10.

Figure 3:
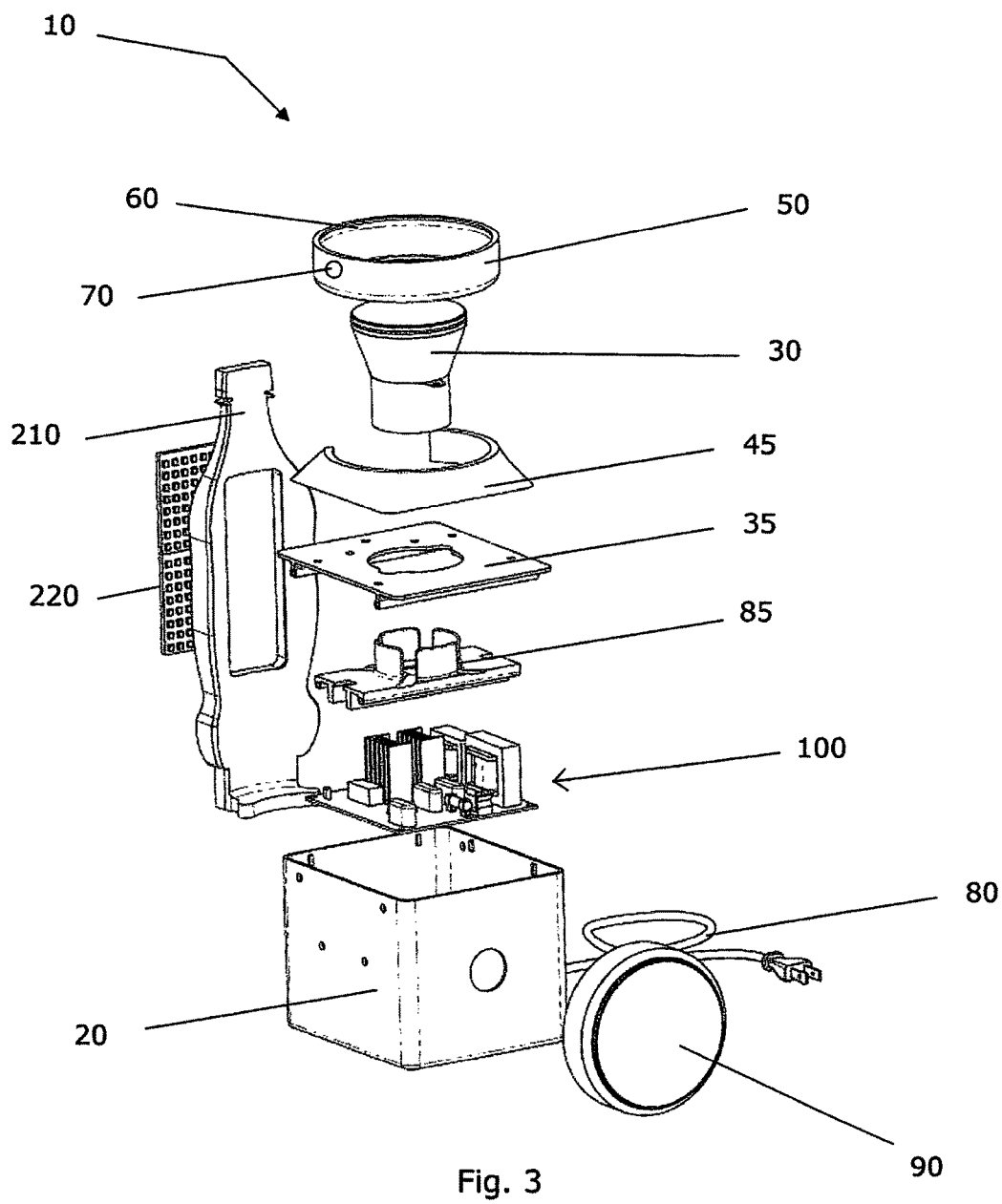
FIG. 3 is an exploded view of the device of FIG. 1.

FIG. 3 is an exploded view of the device 10 of FIG. 1.

Figure 4:
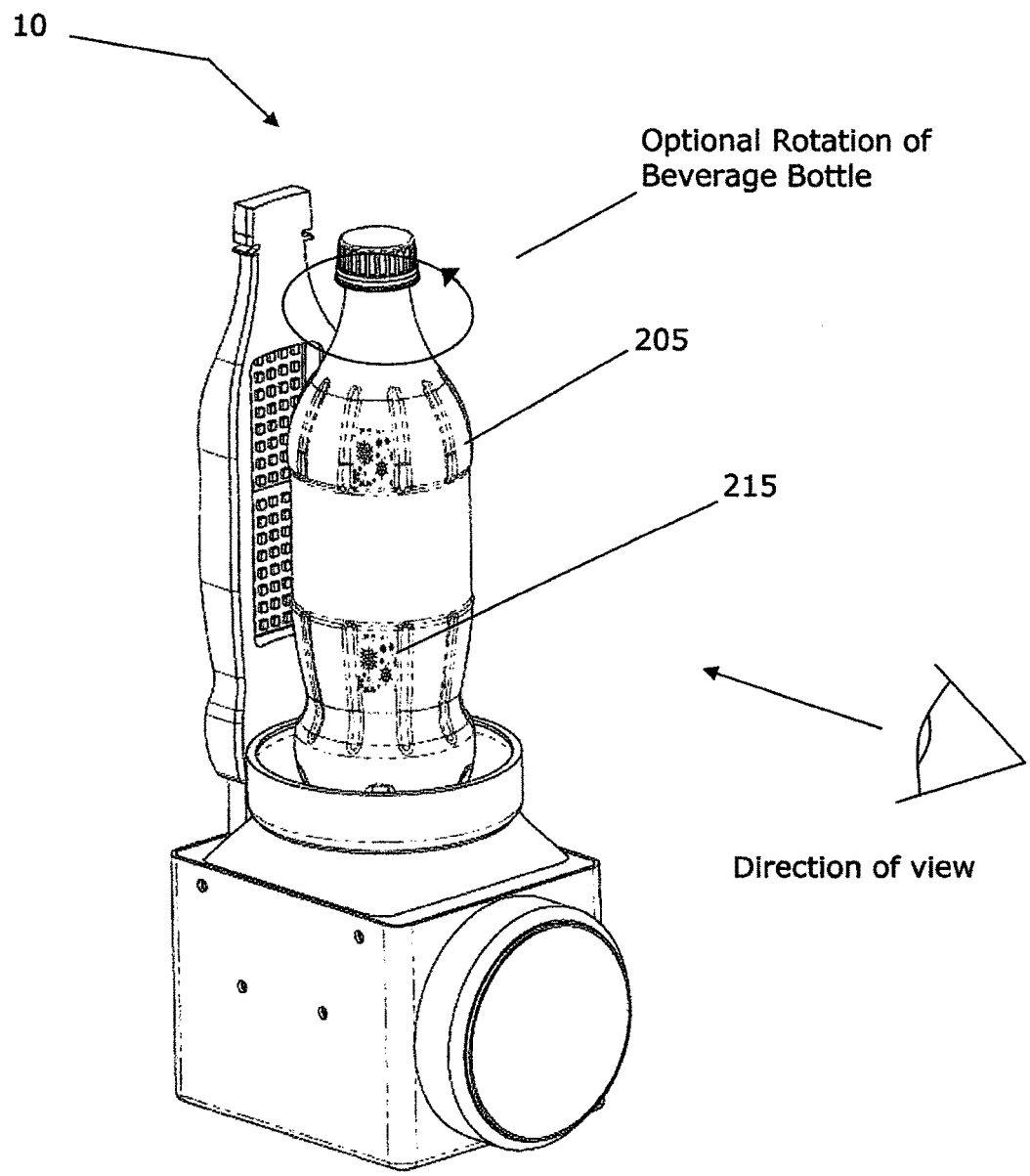
FIG. 4 is another perspective view of the device of FIG. 1 with optional rotation capability.

FIG. 4 is another perspective view of the device 10 of FIG. 1 with optional rotation capability.

Figure 5:
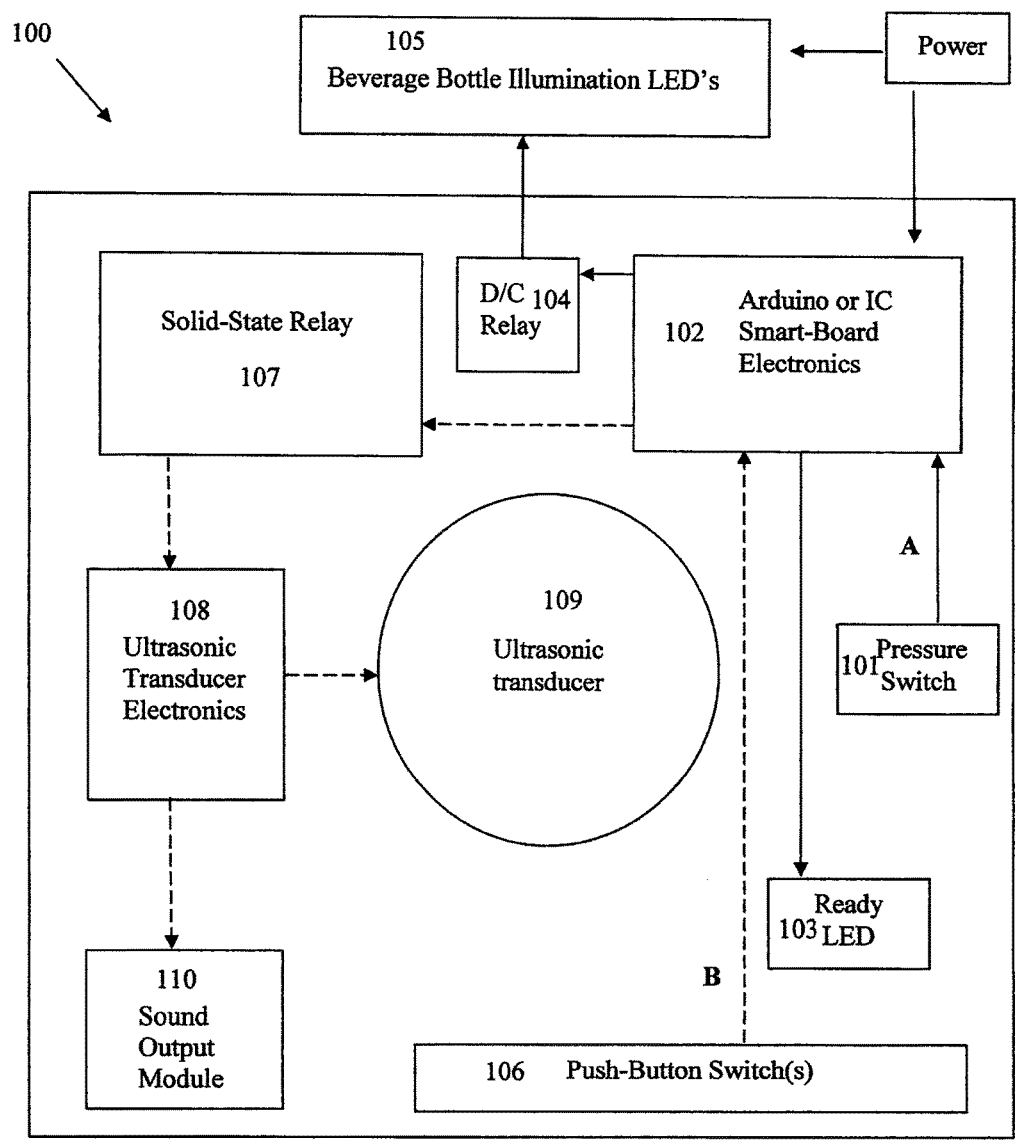
FIG. 5 is a schematic of the electronic components for the device of FIG. 1

FIG. 5 is a schematic of the electronic components 100 for the device 10 of FIG. 1.

Referring to FIGS. 1, 3 and 5, a device 10 for crystallizing liquid to form slush inside of a supercooled to at least below approximately 30 F closed beverage bottles or cans, can include a stand 20 which is a small base, such as a rectangular box or cube, having a housing formed from plastic or metal, for housing electronic components 100 inside. In front of the base 20 can be an activation switch 90 such as a large push button switch, and the like.

The stand 20 with base can be of approximate size of approximately 4 inches wide by approximately 4 inches tall by approximately 5 inches deep or bigger or smaller in any dimension but generally of size which can conveniently be moved or placed on a taller stand or apparatus to bring the bottle viewing area and LED's 220 to eye level for convenient viewing of the ice-crystal nucleation.

On top of the base 20 can be a removable or non-removable bowl or plate 50, such as a cylindrical dish made of various materials such as stainless steel, UHMW, plastics or other alloys or materials which holds an amount of water or other liquid or ultrasonic-transmitting gel of volume approximately ½ oz to approximately 4 oz.

The liquid water, substance or ultrasonic transmitting gel can be in direct or indirect contact with the ultrasonic transducer, bowl, and a beverage bottle which may be placed in the bowl. The purpose of the liquid water, liquid substance or ultrasonic transmitting gel is to uniformly transmit and/or amplify the ultrasonic frequency vibrations from the ultrasonic transducer and/or bowl or plate to the beverage bottle or container placed on the apparatus.

A water-tight thin membrane or cap 60 that allows for and/or amplifies the transmission of ultrasonic frequencies can be used to prevent the beverage bottles or containers placed in the apparatus from making direct contact with the liquid or gel ultrasonic transmission medium.

An example of a liquid ultrasonic transmission medium can include a liquid or a gel. The liquid can include but is not limited to be tap water or sterilized water with preservatives to prevent mold or bacterial growth or water with added substances to enhance ultrasonic frequency transmission. An example of a gel medium can include but is not limited to be a pharmaceutical ultrasonic gel pad used widely in the medical industry The water-tight thin membrane or cap can be made of flexible plastic, vinyl, or other material generally capable of making adequate surface contact area with the beverage bottle placed on the apparatus to allow for transmission of the ultrasonic frequency vibrations into the liquid beverage. The thin membrane or cap can be puncture resistant.

If a liquid transmission medium inside the bowl 50 can be used along with a membrane or cap 60, it can be filled and topped off via a fill nozzle 70.

If a gel transmission medium is used along with a membrane or cap 60, the membrane or cap can be removed in order to insert a gel pad. If a liquid or gel transmission medium is used without a membrane or cap, the liquid or gel can be poured or placed in the bowl or on the plate.

Beneath the membrane, medium, bowl or plate is an ultrasonic transducer 30. An example of the ultrasonic transducer can include but is not limited to a 100 W 40 khz Piezoelectric ultrasonic cleaning transducer as used in ultrasonic cleaning tanks. See for example, U.S. Pat. No. 4,979,994 to Dussault et al. and U.S. Patent Application Publications: 2004/0112413 to Brunner et al.; and 2006/0191086 to Mourad et al., which show piezo transducers with or without ultrasonic drivers, which are incorporated by reference in their entirety.

The base cover 35 and neck 45 provide protection to the ultrasonic transducer and electronics contained in the base. The protection is from dust, debris, and liquid that might be spilled from the bowl or onto the device from the top. The base cover 35 and neck 45 can be angled, ramped or slanted in order to repel liquid in case of beverage spillage, rain, or other liquid spilling on the device. The base cover and neck can also contain grooves or drainage structures to prevent liquid entering the electronics area of the base. A waterproof seal (not shown) can be built-in to the base cover 35 and neck 45 to protect the electronics from moisture.

For outdoor use all external surfaces can be treated with waterproof sealant coatings and UV (ultra-violet) protecting coatings to prevent discoloration or damage from exposure to the sun or other sources of UV radiation.

Stand (base) 20 that houses internal components can be waterproofed or sealed by rubber gaskets and the like to prevent water intrusion or damage from the environment.

The power supply 80 for the device 10 can be by a cord with plug to a 110-120 volt power source or a 220 v power source, or by batteries, and the like. Batteries can include, but are not limited to, 9V, AA, AAA, C, D, or Li-ion or Ni-mh rechargeable batteries. Additionally, the device 10 can be powered from a solar power panel.

The low voltage power can be supplied remotely from an external power converter such as a 12V cigarette lighter power adapter or a 110V/220V AC/DC plug-in power adapter or other low voltage source such that no high voltage AC current is brought to the device 10.

The transducer 30 can be activated by switch 90 such as a large push button switch, toggle switch, and the like.

Alternatively, the transducer 30 can be automatically set off by a pressure sensor 85, and the like, in the bowl 50 which can be set off by placement of the weight of beverage container 205 placed into the bowl 50.

The pressure sensor (such as but not limited to a force sensitive resistor) 85 activates the back-lighting LED 220 and the ready LED (not shown) in the push button to indicate the presence of a bottled beverage or beverage container. The push button switch 90 is pushed to activate the timing electronics 100 which pulse the ultrasonic transducer 30 for a certain period of time creating one or more short pulses (approximately 0.1 s to approximately 2.0 s or more or less) of ultrasonic frequency.

The pulses immediately transfer through the bowl and transmission medium and start to crystallize the liquid via ice-crystal nucleation inside the closed beverage container 205 starting a slushing effect 215 inside the beverage container which rapidly transfers throughout all the liquid contents, converting them into a soft-slush or "hyper-quenched, vitrified-liquid" state.

For beverage containers that are bottles, such as bottles of carbonated soda, and the like, a novel illumination source 220 mounted to a backwall 210, which can have a shape of a beverage container, such as the outer shape of a soda bottle, allows for easy placement of the bottled beverage and easy viewing of the ice-crystallization effects to be viewed by the user.

The backwall 210 and the illumination source 220 can be further treated with waterproofing coatings or covers that are translucent and protect the components from liquid and the environment.

When the switch 90 is pressed, the timing electronics in the electronic components 100 create a short duration ultrasonic pulse from the transducer 30 which produces ultrasonic waves through the transmission medium (water or gel) and to the thin membrane 60 and into the bottled beverage 205. Within the bottled beverage 205, a small amount of supercooled liquid nucleates 215 which will quickly spread and cause the entire beverage liquid to form soft ice-crystals throughout the container 205. When the beverage container 205 is opened, no unwanted foaming will be present which allows the user to enjoy the supercooled 'slushed' beverage without any negative effects.

Due to the beauty of the ice-crystal nucleation (freezing or slushing) process, it is desirable to enhance the visible aspects of this process while it is in the device 10, such as backlighting, side-lighting, or bottom lighting of the beverage within the container. The viewer watches the liquid in the bottle turn into a slushy ice-crystal formation over a period of seconds or tens of seconds depending on how much of the nucleation took place during the button press and depending on the type of beverage ingredients that are present—sugared beverages generally taking longer than non-sugared beverages to complete the slushing process. The ice-crystallization can be described as clouds, crystals, glass, or slush and will be different based on supercooled temperature, beverage contents and beverage color.

Illumination can be designed to light-up automatically upon putting a bottled beverage on the in the bowl 50 via a sensor such as a pressure sensor 85 or via push button switch 90, or may come-on via an ON/OFF switch. The illumination can be designed to illuminate the beverage from the front, back, sides, top or bottom or from multiple angles in order to see through and into the beverage so that the nucleation or 'slushing' of a supercooled beverage can be fully observed. The illumination turn-off automatically when the beverage bottle is removed or via an ON/OFF switch. The device 10 can be designed smaller or larger than illustrated with more or fewer illumination sources (such as more or less LEDs).

The device 10 can be mounted at eye level with the illumination source next to the bottle container 205. The device 10 can operate as follows;
1. The device 10 is normally OFF and will not function until a bottled beverage 205 is placed in the bowl 50 with transmission medium membrane and transmission medium and/or on top of the ultrasonic transducer 30 if no bowl is present. (the invention can be made with or without a bowl, or with a plate or other mechanism for holding a bottled beverage).
2. The illumination sources 220 (LEDs) turn ON when a bottled beverage 205 is placed in the bowl 50 (on the transducer) via a 'pressure-activated-switch 85
3. The push-button switch 90 becomes ACTIVATED when a bottled beverage 205 is placed in the bowl 50.

When the push-button 90 is pushed, an ultrasonic PULSE is sent from the transducer 30 into the liquid or gel medium and through the transmission medium 60 into the bottle 205, which nucleates "slushes" the supercooled liquid inside the beverage bottle 205. The push-button 90 is DE-ACTIVATED for a period of time, such as 2-5 seconds in order to prevent multiple rapid pushes of the button. However, the Illumination source 220 (LEDs) can remain ON as long as the bottle 205 is in the bowl 50 or on the transducer 30 or alternatively for as long as the bottle remains pressed against the wand assembly 440, 450 in the side mounted configuration 400 of the apparatus.

The illumination source 220 can include a plurality of LEDs (Light emitting diodes). A footprint of the illumination source can be for tall bottles (16 ounces to 1 liter), a height of approximately 4½ inches to approximately 7 inches, and a width of approximately 1 inch to approximately 2 inches. A foot print of the illumination source for short bottles (8 ounces to 14 ounces) can have height of approximately 2 inches to approximately 4 inches, and a width of approximately 1 inch to approximately 2 inches.

The intensity of the LEDs can be adjusted by size, weight, or type of the beverage bottles being used. For example, bright LEDs or superbright LEDS can be used and if a small bottle is detected based on it's weight against the FSR 85, only the lower portion of the LEDs can illuminate.

An optional dimmer switch can be used to control intensity levels. For example a dark soda, such as colas can require maximum intensity of superbright LEDs for proper viewing of the ice-crystal nucleation whereas a clear soda or bottled water may require dimmer LED backlighting when viewing.

In a preferred embodiment, a pattern of approximately 96 LEDs can be used consisting of two 48 SMD LED 12V Dome Panels stacked vertically with all LED's backlighting larger bottles and only the lower panel backlighting the smaller bottles.

An alternative configuration can be used with waterproof strip SMD LEDs such as 50/50 or 35/28 strips of LEDs using horizontal or vertical placements of small strips of LEDs.

The illumination source 220 can be placed approximately ¼ inch to approximately 1 inch spaced apart from the beverage bottle container 205.

The illumination source 220 can be multi-color, flashing, or moving LED's to enhance the visual effects of the nucleation "slushing" process.

The Illumination sources 220 can be of any number, shape, size, color, of LED's and can be made of other light sources than LED's, for example neon-lights, halogen lights, florescent lights or other lighting mechanisms (not shown in drawings).

A schematic 100 for running the device 10 is shown in FIG. 5. Pressure switch 101 is also the force sensitive resistor (FSR) pressure switch 85 previously described. An example of the FSR used can include but is not limited to be a 0.5 inch diameter round force sensitive resistor able to detect a wide range of pressure applied to the sensitive area with a high degree of precision, allowing the device to detect the difference between sizes and types of bottles placed on the apparatus.

Arduion or IC (integrated circuit) smart-board electronics 102 can be an Arduino Uno, Mini, or Pro Smart Board or other version of the Arduino platform of smart electronic computer boards, Microchip PIC microcontroller, Raspberry Pi microcontroller, and the like. Various types of microelectronics can be used, such as but not limited to Arduino boards used with ultrasonic transducers, which are described in U.S. Pat. No. 9,024,168 to Peterson (column 4) and U.S. Patent Application Publication: 2014/0125577 (paragraphs 53-56) to Hoang et al. and 2015/0112451 to Dechev et al. (paragraph 112), which are incorporated by reference in their entirety.

Ready LED 103 can be an imbedded LED within the push button that illuminates the pushbutton from the inside allowing the user to know it is ready to be pressed.

D/C Relay 104 can be direct current relay such as a single DC/DC relay or relay board.

Beverage bottle illumination LEDs 105 is also the illumination source 220 previously described.

Push button switch 106 is also the push button switch 90 previously described.

Solid state relay 107 can include but is not limited to be a Berme BEM-14840DA Solid-State Relay.

Ultrasonic transducer electronics 108 can be an ultrasonic transducer driver board made for 110V, 100 W, 40 khz or similar, with the ultrasonic transducer 109 can be the transducer 30 previously described, such as but not limited to a 100 W, 40 khz piezoelectric ultrasonic cleaning transducer or similar.

Sound output module 110 can include but is not limited to be a piezo speaker module or similar.

Power source 111 can include the power source 80 previously described.

Referring to FIG. 5 in relation to FIGS. 1-4, the components interact as follows:

Block Diagram Path A

Step 1: A supercooled beverage bottle 205 is placed in the bowl 50 which is in contact with the ultrasonic transducer 30 and/or transfer medium (water, liquid or gel) or membrane 60.

Step 2: The pressure switch 70 is activated by the weight of the bottle 205, which sends a signal to the Arduino or IC Smart-board electronics 102 that a bottle 205 is present. (In one embodiment, the pressure switch 85 and smart-board electronics 102 can determine the size and type of beverage by weight.)

Step 3: The Ready LED 103 is activated

Step 4: The D/C Relay 104 is activated providing power to the Illumination LEDs 105/220.

Step 5: The Illumination LED 105/220 are powered ON to shine through the bottle 205 for the viewer.

Block Diagram Path B

Step 6: The Push Button Switch 90 is pressed by the user sending a signal to the Arduino or smart-board electronics 102.

Step 7: The Arduino or smart-board electronics 102 activates the solid-state relay 107 to energize the ultrasonic transducer electronics 108 for a short-duration pulse (approximately 0.1 to approximately 2.0 seconds). (note: if a bottle 205 is not present on the pressure switch 85, the Arduino or smart-board electronics 102 will not activate the solid-state relay 107 when the push-button switch 90 is pressed.)

Step 8: The ultrasonic transducer electronics 108 energizes the ultrasonic transducer 109/30 for the short duration pulse which nucleates the supercooled beverage inside the bottle 205 and begins to create a slush. In addition, the optional sound output module 110 creates a sound effect while the slush is forming in the bottle 205, which may take between approximately 1 and approximately 30 seconds.

The Illumination LEDs 220/105 remain ON while the bottle 205 is detected in the bowl 50 for a duration of time (between approximately 30 seconds up to several minutes). The Illumination LEDs 105/220 will switch OFF when the bottle 205 is removed or the time setting expires.

Automated Delay

The Arduino or smart-board electronics 102 will force a delay (of approximately 1 to approximately 5 seconds) before allowing a subsequent pressing of the push-button 90 to cause a subsequent ultrasonic pulse to be sent. This feature will prevent repeated, rapid ultrasonic pulses being sent to the ultrasonic transducer 109/30 which can cause undesirable results such as foaming overflow of sodas. Additionally, a longer automated delay (of approximately 30 to approximately 60 seconds) will take place if a certain number of ultrasonic pulses are sent to the same bottle 205 (between approximately 3 and approximately 5) in a short period of time (approximately 10 to approximately 15 seconds) in order to prevent undesirable overflow or pressure due to possible CO2 (carbon dioxide) expansion inside a bottled beverage 205 caused by the repeated ultrasonic pulsing.

The wattage (W) and time duration of the ultrasonic signals can be adjusted based on having different transmission mediums (water, gel), as well as different types of beverages, such as soda/juice and diet soda. The sugar in soda/juice and non-sweeteners in diet soda can have different transducer emitter times as shown in Tables 1 and 2. The ranges of seconds can include the term "approximately" before each of the numerical values.

Table 1 shows a timing matrix for the nucleator (crystallization) pulse power (wattage (W)) in range of seconds for a water based transmission medium.

TABLE 1

| Beverage | 15 W | 25 W | 35 W | 60 W | 100 W | 150 W |
|---|---|---|---|---|---|---|
| Soda/Juice | 0.3-1.5 seconds | 0.3-1.0 seconds | 0.2-0.9 seconds | 0.2-0.8 seconds | 0.1-0.6 seconds | 0.1-0.4 seconds |
| Diet soda/Bottle Water | 0.2-1.0 seconds | 0.3-0.8 seconds | 0.1-0.7 seconds | 0.1-0.6 seconds | 0.1-0.4 seconds | 0.05-0.3 seconds |

Table 2 shows a timing matrix for the nucleator (crystallization) pulse power in range of seconds for a gel based transmission medium.

TABLE 2

| Beverage | 15 W | 25 W | 35 W | 60 W | 100 W | 150 W |
|---|---|---|---|---|---|---|
| Soda/Juice | 0.5-2.0 seconds | 0.5-1.8 seconds | 0.3-1.7 seconds | 0.3-1.5 seconds | 0.3-1.2 seconds | 0.2-1.0 seconds |
| Diet soda/Bottle Water | 0.3-1.8 seconds | 0.3-1.7 seconds | 0.2-1.4 seconds | 0.2-1.2 seconds | 0.2-1.0 seconds | 0.1-0.8 seconds |

Referring to FIG. 4, optional rotation of the beverage container can also be used. Adding rotation or spinning to the base of the device 10 in order to rotate beverage bottles 2015 just prior or during the process of nucleating the beverage can further add additional excitement and visual enhancement to the visible beauty of the nucleation (freezing/slushing) process.

The rotation can be of slow RPM such as approximately 60 to approximately 100 RPM of duration of a few seconds to a few tens of seconds in order to move the liquid inside the beverage bottle in a circular motion just prior to—and during—ice-crystal nucleation. The benefit of the rotation is that the small ice-crystals that form at the beginning of ice-crystal nucleation are in motion as they expand within the beverage to create the slushing effect. The motion adds fascination and visual excitement to the process for the end user.

Figure 6:
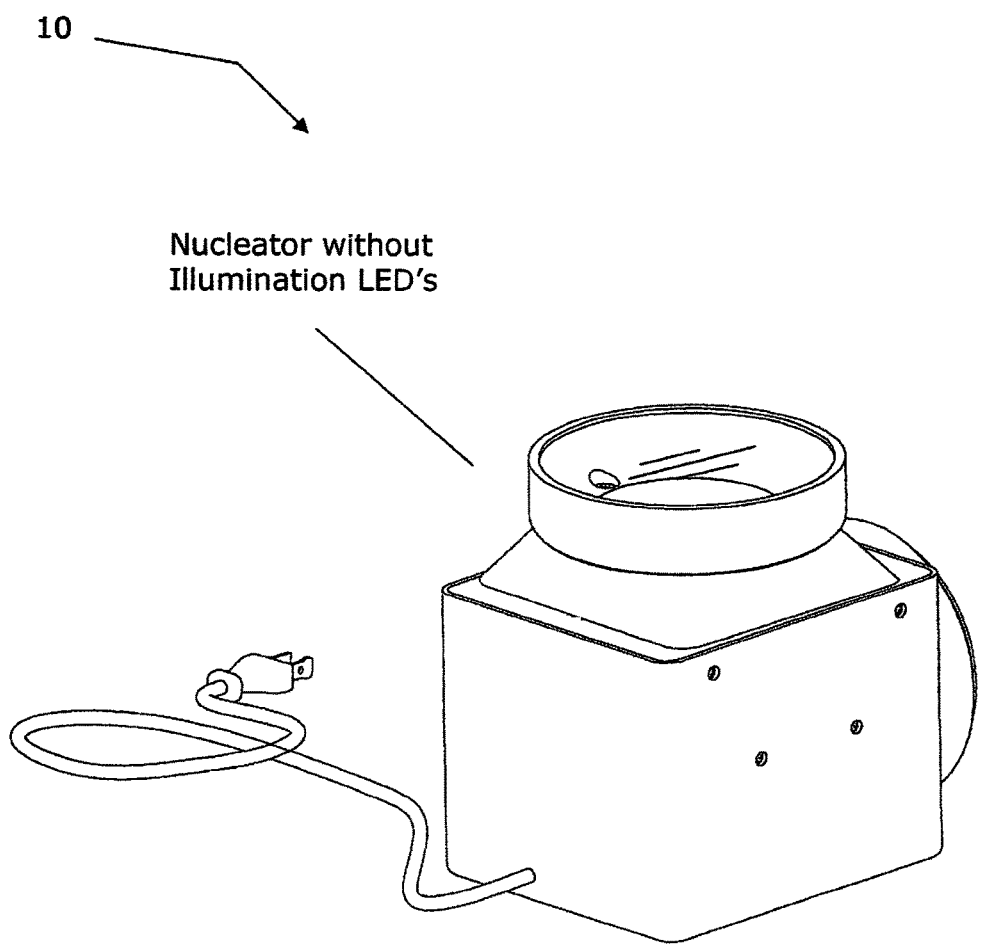
FIG. 6 is an upper rear right perspective view of a second embodiment device for crystallizing liquid to form slush inside chilled bottles with no illumination source.

FIG. 6 is an upper rear right perspective view of a second embodiment device 10 for crystallizing liquid to form slush inside chilled bottles with no illumination source. This embodiment works the same as the previous embodiment with the exception of not having the illumination sources 220. This embodiment can be used with beverages that are opaque such as milkshakes or with canned beverages, and the like.

Device 10 can be stand-alone, on a pedestal, or mounted to a supercooling refrigeration system, portable cooler, or other secondary device.

Figure 7:
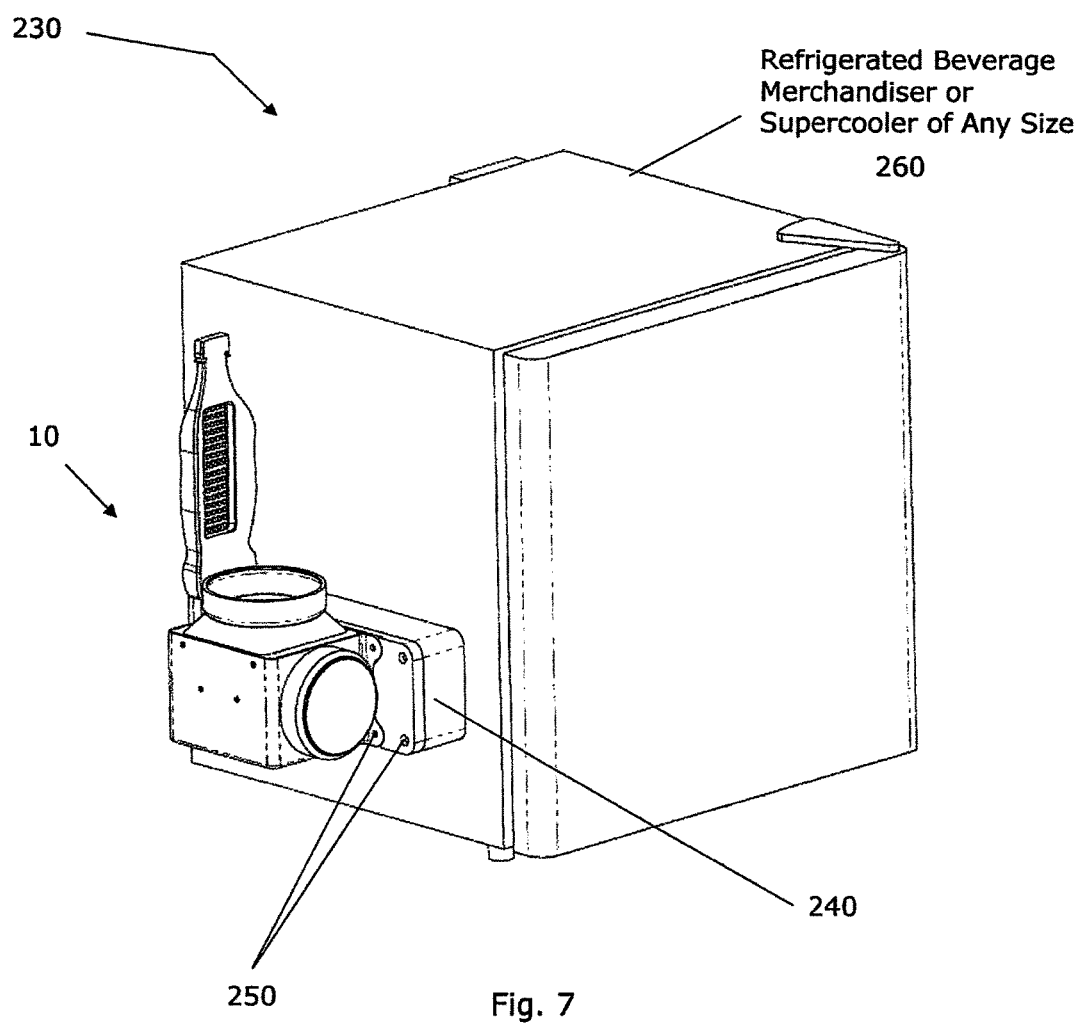
FIG. 7 is an upper left perspective view of the device of FIG. 1 attached to the side of refrigerated beverage merchandiser or other cooling device.

FIG. 7 is an upper left perspective view of the device 10 of FIG. 1 attached to the side of refrigerated beverage merchandiser or other cooling device 260. Commercial devices 260 can be a refrigerant display case in a retail store that supercools beverage containers such as bottles to less than approximately 30 F.

A side mount 240 can be attached to the sides of merchandiser or cooling device 260 by magnets or fasteners, such as screws and bolts. Flanges 250 extending from the sides of the base of device 10 can fasten the device 10 to the mount 240. The mount can be hollow with an access door (not shown) such that it can contain items such as ultrasonic gel pads, membranes, or liquid transmission medium fluid.

Figure 8:
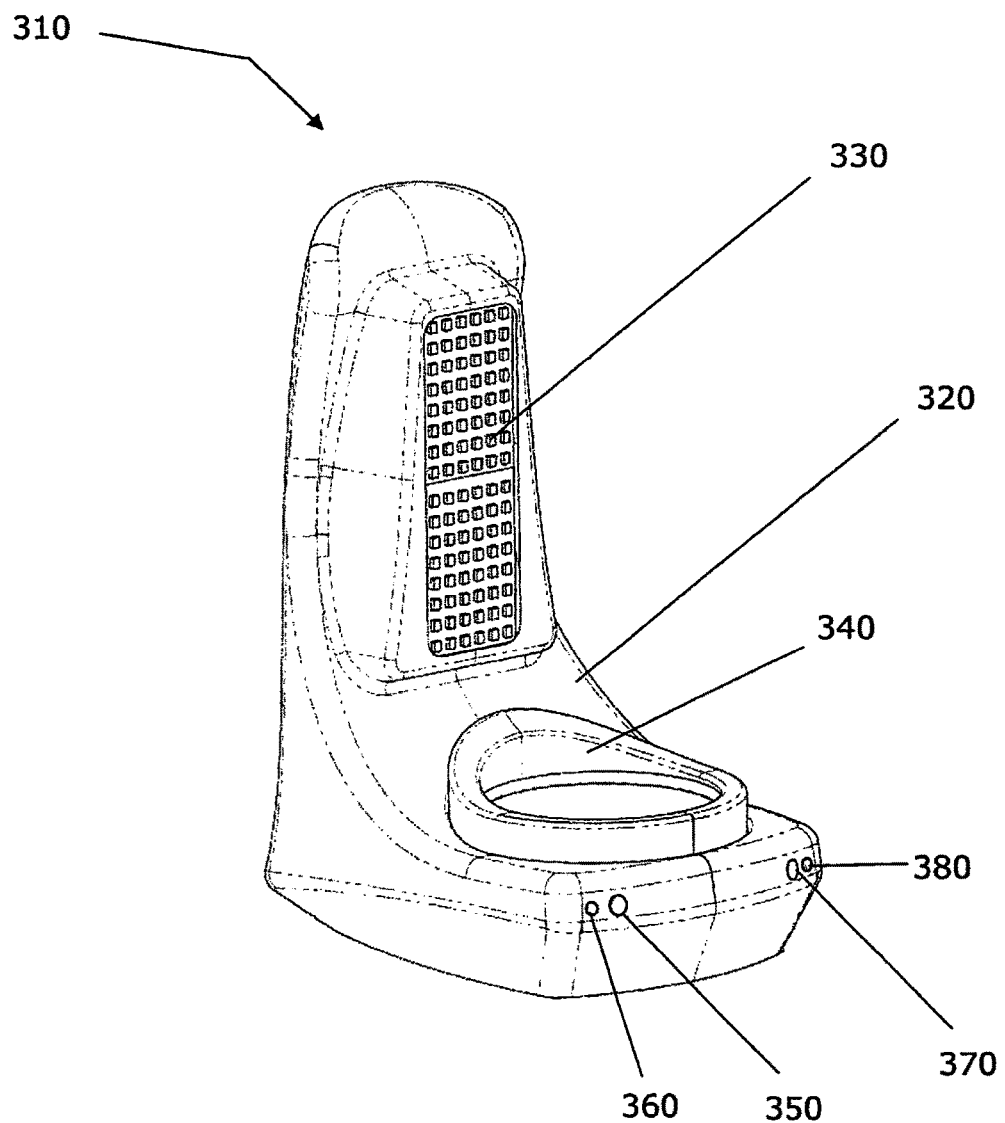
FIG. 8 is an upper front left perspective view of a third embodiment device for crystallizing liquid to form slush inside chilled bottles with an illumination source.
Figure 9:
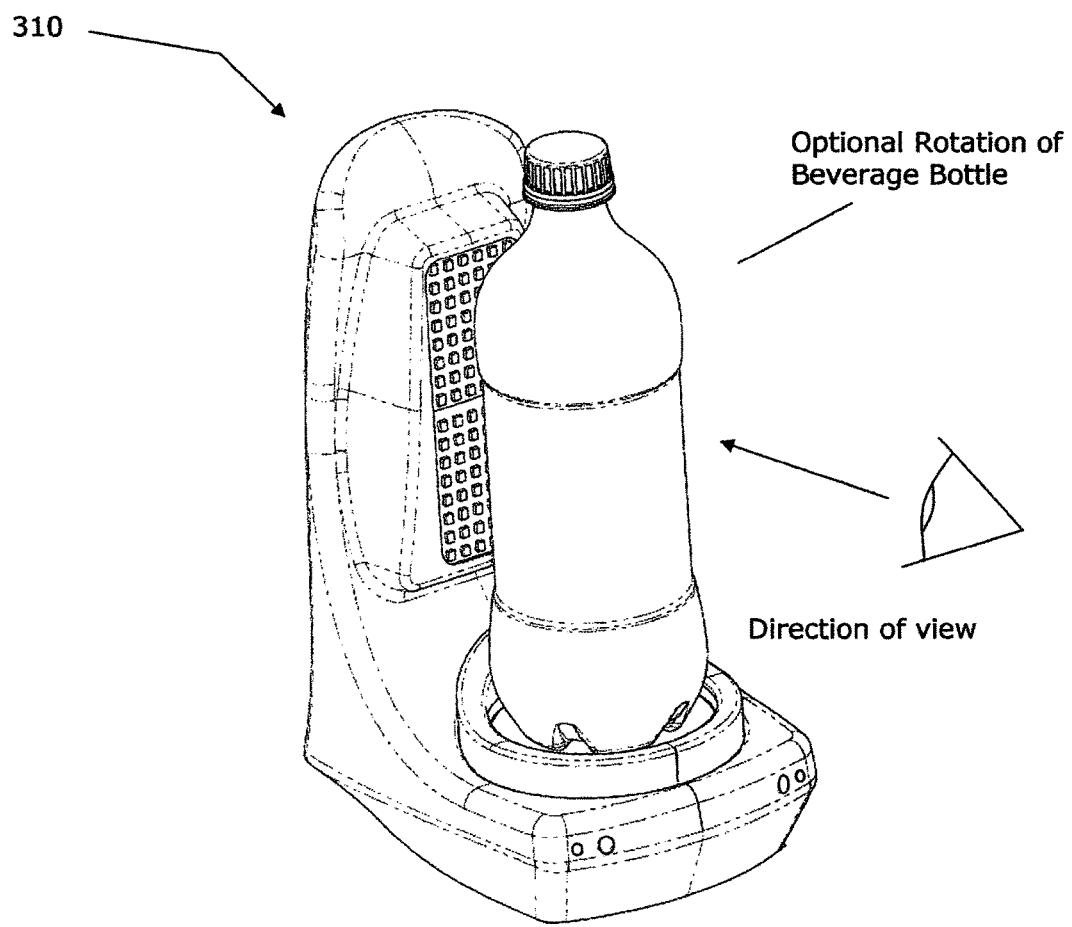
FIG. 9 is another perspective view of the device for bottles of FIG. 8 with a bottle mounted on the device.
Figure 10:
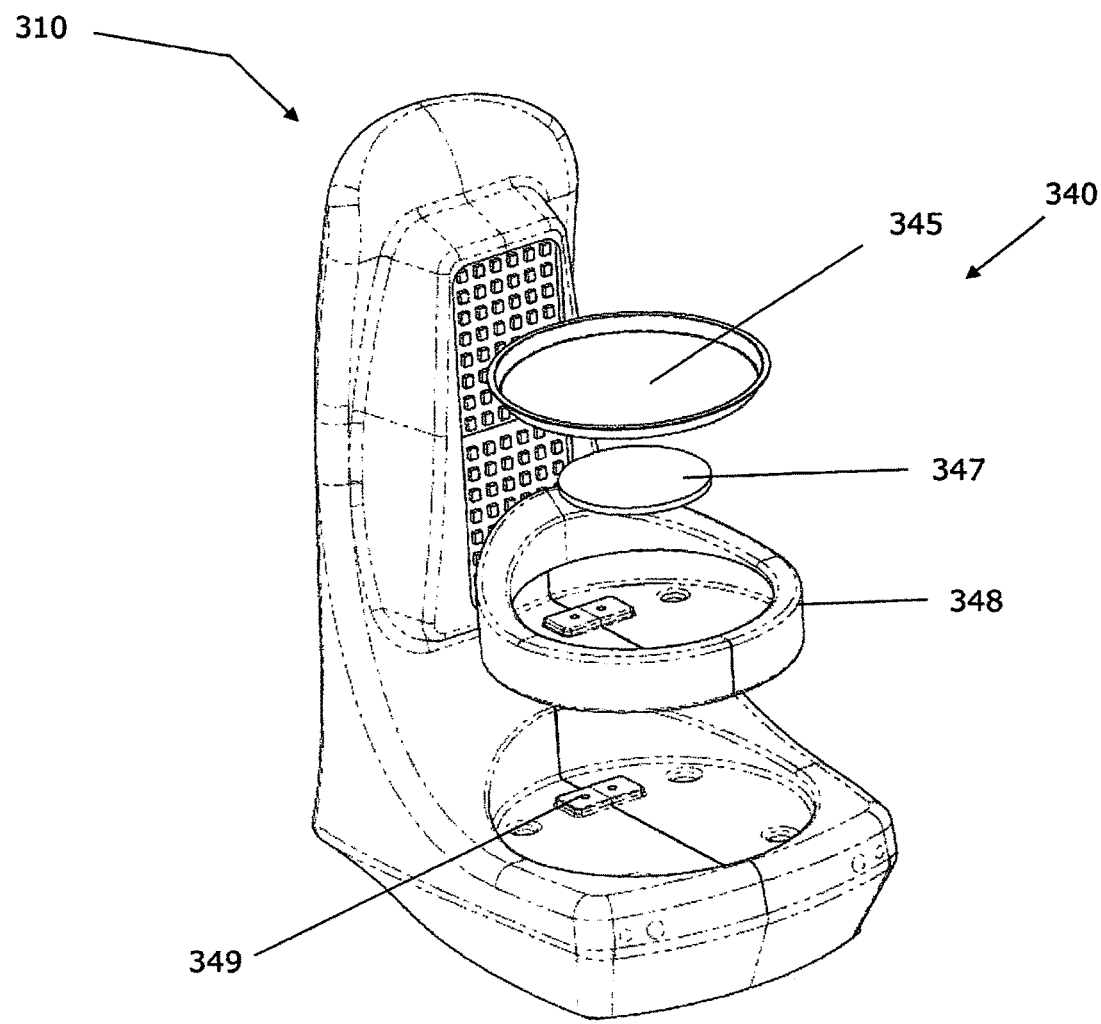
FIG. 10 is an exploded view of the device of FIG. 9.
Figure 11:
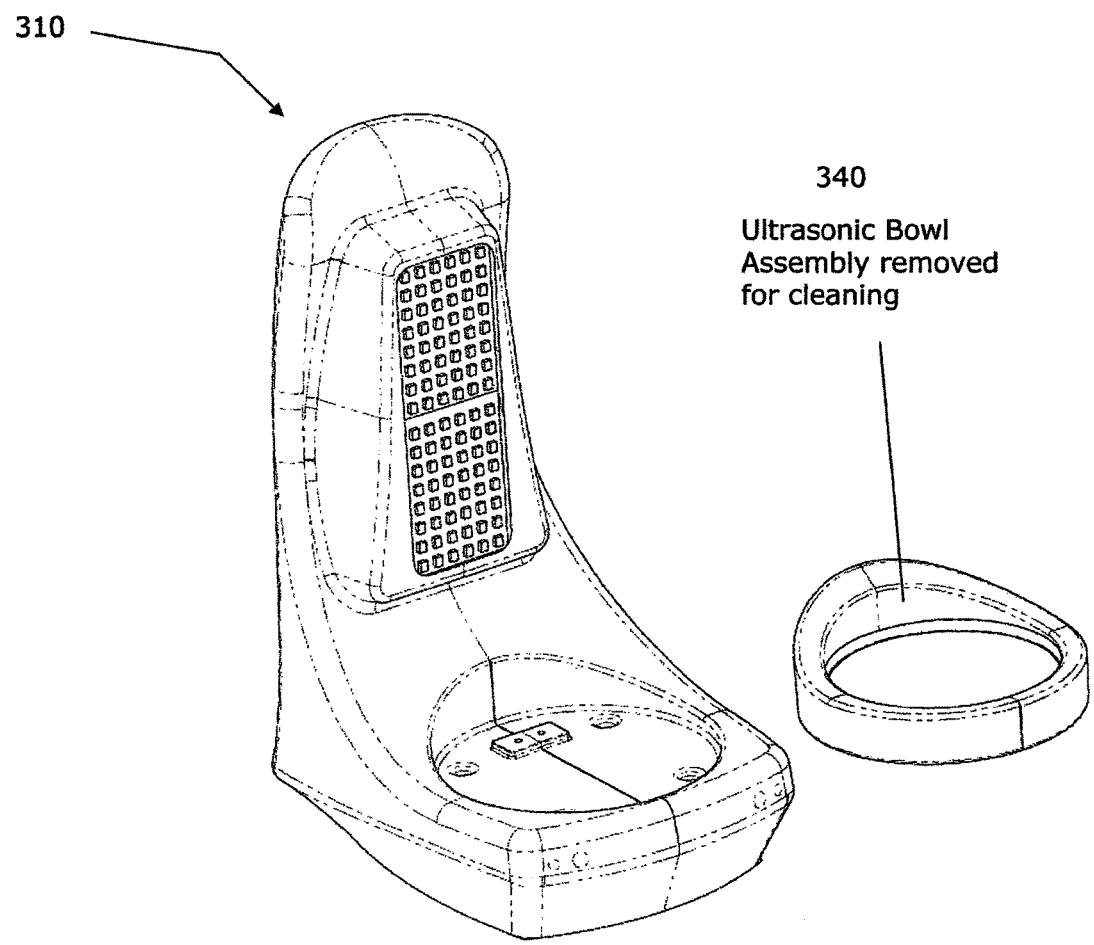
FIG. 11 is another perspective view of the device of FIG. 9 with bowl assembly removed for cleaning.

FIG. 8 is an upper front left perspective view of a third embodiment device 310 for crystallizing liquid to form slush inside supercooled bottles with an illumination source 330. FIG. 9 is another perspective view of the device 310 for bottles of FIG. 8 with a bottle 315 mounted on the device 310. FIG. 10 is an exploded view of the device 310 of FIG. 9. FIG. 11 is another perspective view of the device 310 of FIG. 9 with bowl assembly 340 removed for cleaning.

Referring to FIGS. 8-11, the device 310 works similar to device 10 with an illumination source previously described. Here device 310 can include a sleeker stand 320 being more aesthetically useful for home and/or private use and resembles a cordless handheld phone. An illumination source 330 such as LEDs (light emitting diodes), can operate similar to the previous embodiment device 10. Power and operation can function similar to previous embodiment 10.

Component 340 refers to removable bowl assembly similar to bowl 50 previously described but containing a wafer-type ultrasonic transducer attached to the underside of a metal alloy or plastic plate or bowl.

Component 347 refers to wafer style piezoelectric ultrasonic of 15 W, 25 W, 35 W or 50 W power or similar.

Component 348 refers to a plastic bowl or plate that contains electrical contacts to allow electrical transmission from the base connector 349 to the piezoelectric ultrasonic transducer 347.

Component 349 refers to base electrical connector for allowing the bowl 348 to be removed from the apparatus for cleaning or filling with water or ultrasonic transmission fluid.

Component 350 refers to a touch sensitive button to fire the ultrasonic transducer pulse.

Component 360 refers to a ready indicator LED to indicate the unit is ready for button push.

Component 370 refers to a touch sensitive power-on button to turn the device on and off.

Component 380 refers to a power-on indicator LED to show the unit is on or off.

For operating the device, a beverage bottle or container is placed on the bowl assembly 340, in contact with the liquid medium and the plate 345. The power button 370 is pressed and the device is turned ON as indicated by the power LED 380. The backlighting LED's 330 illuminate the beverage bottle. The ready LED 360 turns on and the firing button 350 is pressed by the user. The ultrasonic transducer 347 sends a short duration pulse through the plate and transmission medium into the beverage container. The supercooled beverage inside the container will begin ice-crystal nucleation and the slushing process will begin as the user watches from the vantage point shown in FIG. 9.

The embodiment of FIGS. 8-11 can also have optional rotation or spinning of the beverage bottle similar to the rotating and spinning capability described in the previous embodiment.

Figure 12:
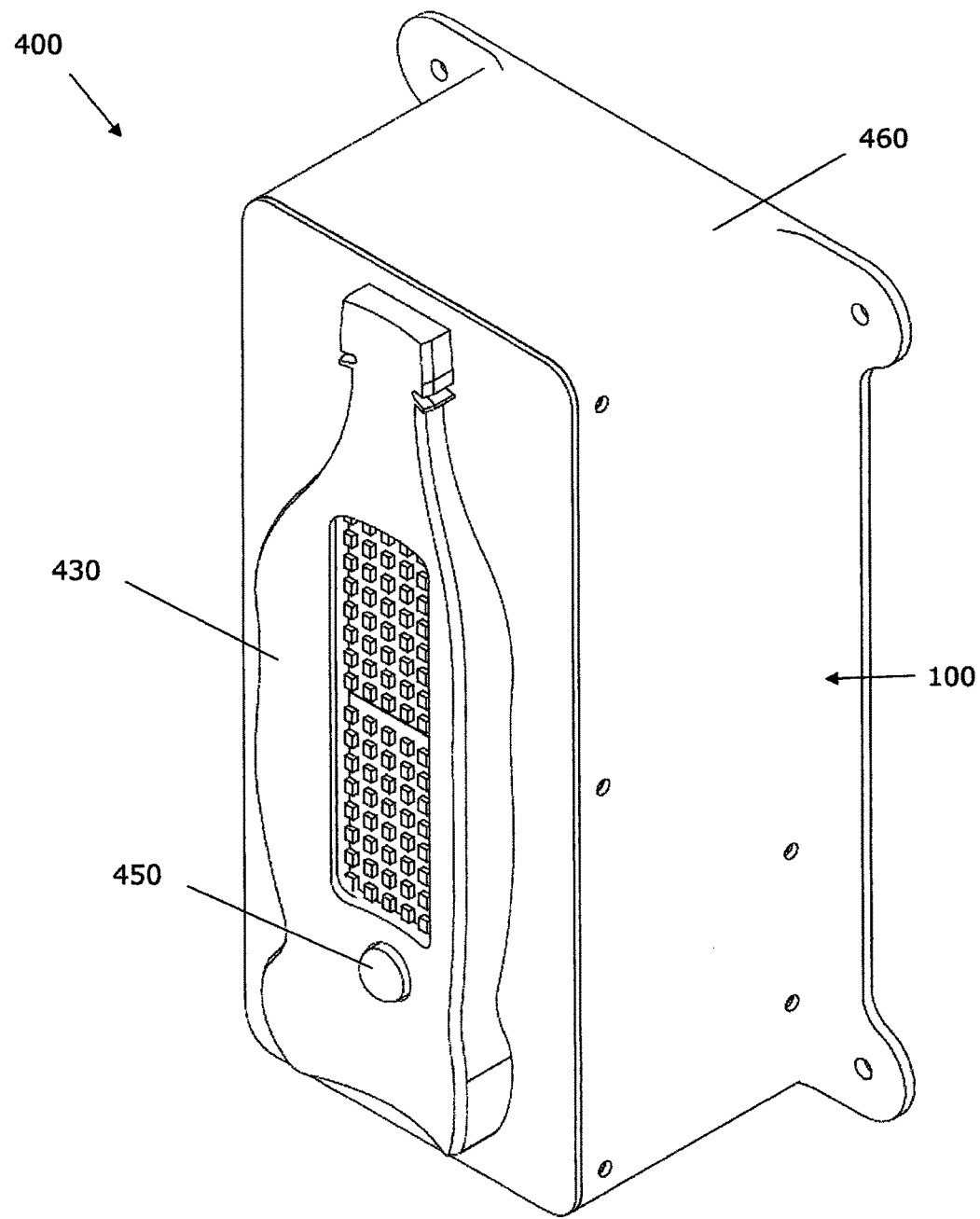

FIG. 12 is another perspective view of another embodiment of a device 400 for crystallizing liquid to form slush inside chilled bottles using a contact membrane 450 with liquid or gel transmission medium inside. The bottle backlighting assembly 430 indicates where the bottle should be held and pressed against by the user.

Figure 13:
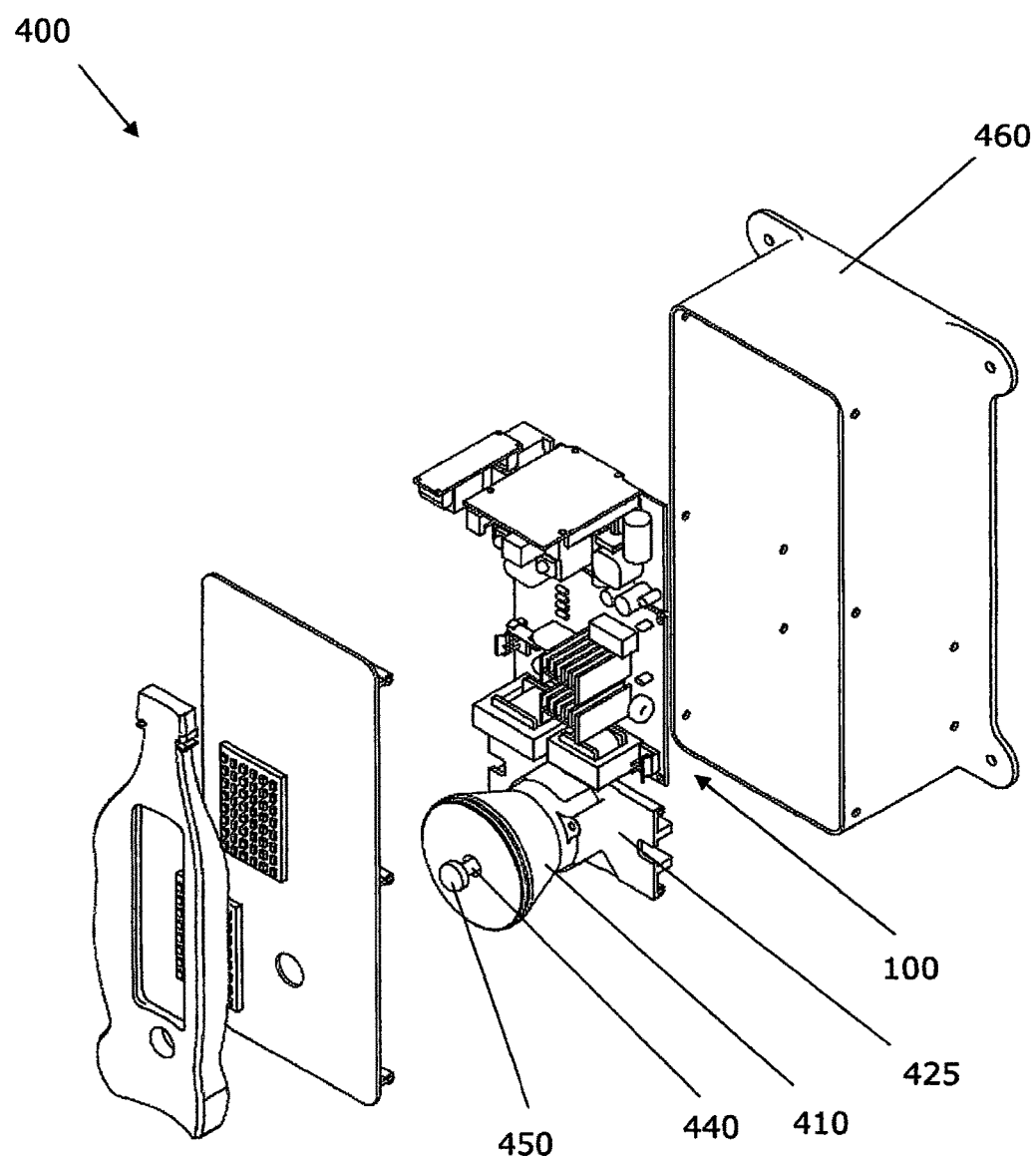
FIG. 13 is an exploded view of the device of FIG. 12.

FIG. 13 is an exploded view of the side pressed embodiment. This embodiment can use a wand 440 which includes an extension arm 440 connected securely to the ultrasonic transducer 410. A water-tight membrane 450 similar to the previous embodiments can be attached to the end of the wand 440 and is filled with liquid (such as water) or a gel. Timing electronics 420 such as electronics 100 previously described can produce the ultrasonic pulse when a switch and/or a pressure sensor is activated. A pressure switch force sensitive resistor and support 425 is used to detect the presence of a bottle on the device.

The wand end 450 can be placed in physical contact with a supercooled beverage bottle (not shown) and will cause nucleation within the beverage when the pulse is generated.

Component 430 refers to a bottle design back plate and LED housing.

Component 440 refers to a wand attachment to the ultrasonic transducer and a liquid or gel medium and membrane.

A mounting box 460 can attach the wand embodiment 400 to a wall or cabinet or merchandiser, and the like, by using conventional fasteners, such as screws or bolts through box flanges to the underlying vertical support.

In operation, the wand 440 is directly attached to the ultrasonic transducer 410 such that the ultrasonic frequency vibrations are transmitted to the end of the wand and through the liquid or gel medium and membrane 450 into the beverage container that is in contact with the membrane. The nucleation effect is similar to that of the previously described embodiments.

The term "approximately" throughout the application can be +/−10% of the amount referenced. Additionally, preferred amounts and ranges can include the amounts and ranges referenced without the prefix of being approximately.

The devices referenced above can be designed as a counter-top display in TWO-PARTS, with the ultrasonic Nucleator being separate from the Illumination LED's—or even MULTIPLE-PARTS with multiple lighting sources separate from the Nucleation device.

Although the drawings show devices, All components of the present invention can be constructed as part of the larger assembly of a beverage merchandiser, vending machine, or other supercooling capable refrigerated device or they may be made separate and free-standing either individually or collectively.

The invention can be used with beverage bottles that are sealed and not opened, as well as can be with beverage bottles that are opened and closed again.

The invention can be used with closed beverage bottles, that include glass bottles and plastic bottles, as well as canned beverages, such as those in aluminum cans, and the like.

The invention can be used with sealed beverage containers made of cardboard, wax paper, plastic or multi-layer constructions. The invention can also be used with re-usable containers with removable lids or caps.

The invention can be used with open beverage containers such as glass, plastic or metal cups or containers.

The invention can be used with containers of liquids, gelatins, or combinations of cold food ingredients such as ice-creams to create unique ice-crystal nucleations or emulsions.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A device for crystallizing liquid to form slush inside of supercooled to below 32 F closed beverage bottles, cans or containers, comprising in combination:
   a refrigerator housing closed beverage containers that each contain liquids, the beverage containers being selected from beverage bottles and beverage cans, the refrigerator cools the beverage containers to a temperature below 32 F;
   a base having a top and a bottom configured to be supported on a support surface adjacent to the refrigerator;
   a holder having an upper surface and a lower surface configured to rest on the top of the base, the upper surface configured to support one of the supercooled closed beverage containers with a liquid inside;
   an ultrasonic transducer below the upper surface of the holder, the transducer configured to generate an ultrasonic signal having a pulse duration between approximately 0.1 seconds and less than 2 seconds; and
   a transmission medium between the transducer and the upper surface of the holder, configured to transmit the ultrasonic signal to pass from the transducer and adapted to be passed into the liquid inside the bottle, wherein activating transducer causes the transmission of the ultrasonic signal from the transducer to pass into the beverage container which crystallizes the liquid inside of the beverage container into a slush inside of the beverage container.

2. The device of claim 1, wherein the transmission medium is water.

3. The device of claim 1, wherein the transmission medium is a gel.

4. The device of claim 1, further comprising:
   a push button on the base for activating the device to start the transducer.

5. The device of claim 1, further comprising:
   a pressure sensor in the holder, wherein placement of the beverage container activates the transducer to emit the ultrasonic signal.

6. The device of claim 1, further comprising:
   a mount adaptable for attaching the device to a side of the refrigerator.

7. The device of claim 1, wherein the ultrasonic transducer is selected from the group consisting of approximately 28 khz, approximately 40 khz, and approximately 55 khz.

8. The device of claim 1, wherein the ultrasonic transducer has a wattage selected from the group consisting of approximately 15 W, approximately 25 W, approximately 35 W, approximately 60 W, approximately 100 W and approximately 150 W.

9. The device of claim 1, further comprising:
   an illuminating source attached to the device, wherein the illuminating source emits light is adapted to pass through the bottle when the transducer is activated.

10. The device of claim 9, wherein the illuminating source includes LEDS (light emitting diodes).

11. The device of claim 9, wherein the illuminating source includes:
    a backwall for backlighting space above the beverage container holder.

12. The device of claim 9, wherein the illuminating source includes:
    a sidewall for side-lighting space above the beverage container holder.

13. The device of claim 9, wherein the illuminating source includes:
    a front wall for front lighting space above the beverage container holder.

14. The device of claim 9, wherein the illuminating source includes:
    a top mount for the illuminating source for top-lighting space above the beverage container holder.

15. The device of claim 9, wherein the illuminating source includes:
a bottom mount for the illuminating source for bottom-lighting space above the beverage container holder.

16. A method for crystallizing liquid inside of closed beverage containers into slush, comprising the steps of:
providing a cooling device for housing closed beverage containers that each contain liquids;
cooling the liquids inside of the closed beverage containers to a temperature below 32 F;
providing a crystallizing device for crystallizing the liquids inside of the containers, to be adjacent to the cooling device;
providing the crystallizing device with a holder having an upper surface and a lower surface;
placing one of the closed beverage containers with the liquid inside of the closed container having a temperature below 32 F, on the upper surface of the holder;
providing an ultrasonic transducer below the upper surface of the holder;
generating an ultrasonic signal having a duration between approximately 0.1 seconds and less than 2 seconds through the closed beverage container to pass into the liquid inside of the closed container that has been cooled to less than 32 F, and
crystallizing the liquid inside of the beverage container into a slush inside of the closed beverage container with the generated ultrasonic signal.

17. The method of claim 16, further comprising the step of:
providing a transmission medium between the holder and the closed beverage container, the transmission medium being selected from at least one of: water and gel.

18. The method of claim 16, further comprising the step of:
Illuminating the beverage containers during the crystallizing step.

19. A system for forming slush from liquids inside of closed beverage containers, comprising:
a cooling device housing closed beverage containers that each contain liquids, the beverage containers being selected from beverage bottles and beverage cans, the refrigerator cools the liquids inside of the beverage containers to a temperature below 32 F;
a liquid crystallizing device adjacent to the cooling device, the liquid crystallizing device having a holder with an upper surface and a lower surface, the upper surface supports one of the closed beverage containers with the inside liquid having been cooled to less than 32 F; and
an ultrasonic transducer below the upper surface of the holder, the transducer configured to generate an ultrasonic signal having a duration between approximately 0.1 seconds and less than 2 seconds, wherein activating the transducer generates the ultrasonic signal having a duration between approximately 0.1 seconds and less than 2 seconds from the transducer to pass into the beverage container which crystallizes the liquid inside of the beverage container into a slush inside of the beverage container.

* * * * *